United States Patent
Andrianakou et al.

(10) Patent No.: US 10,931,620 B2
(45) Date of Patent: Feb. 23, 2021

(54) CALCULATING EFFICIENT MESSAGING PARAMETERS

(71) Applicant: Microsoft Technology Licensing, LLC, Redmond, WA (US)

(72) Inventors: Sofia Andrianakou, Sunnyvale, CA (US); Mohamed Gamal Mohamed Mahmoud, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 15/276,421

(22) Filed: Sep. 26, 2016

(65) Prior Publication Data
US 2018/0091467 A1   Mar. 29, 2018

(51) Int. Cl.
| | | |
|---|---|---|
| *H04L 12/58* | (2006.01) | |
| *G06Q 50/00* | (2012.01) | |
| *G06Q 30/02* | (2012.01) | |
| *H04L 29/08* | (2006.01) | |
| *G06Q 30/06* | (2012.01) | |

(52) U.S. Cl.
CPC ......... *H04L 51/32* (2013.01); *G06Q 30/0241* (2013.01); *G06Q 30/0255* (2013.01); *G06Q 30/0269* (2013.01); *G06Q 30/0631* (2013.01); *G06Q 50/01* (2013.01); *H04L 67/306* (2013.01); *H04L 51/22* (2013.01)

(58) Field of Classification Search
CPC ....... H04L 51/32; H04L 51/22; H04L 67/306; G06Q 30/0241; G06Q 30/0255; G06Q 30/0269; G06Q 30/0631; G06Q 50/01
See application file for complete search history.

(56) References Cited

U.S. PATENT DOCUMENTS

| | | | | |
|---|---|---|---|---|
| 7,080,117 | B2 * | 7/2006 | de Pinto | ........ G06Q 10/063112 709/203 |
| 7,505,919 | B2 * | 3/2009 | Richardson | ............ G06Q 10/06 705/7.14 |
| 7,552,069 | B2 * | 6/2009 | Kepecs | .................. G06Q 30/02 705/14.25 |

(Continued)

OTHER PUBLICATIONS

Johnson et al., "To Whom, When, and How Much to Discount? a Constrained Optimization of Customized Temporal Discounts", Journal of Retailing 89, pp. 361-373. (Year: 2013).*

(Continued)

*Primary Examiner* — Backhean Tiv
*Assistant Examiner* — Jonathan A Sparks
(74) *Attorney, Agent, or Firm* — Schwegman Lundberg & Woessner, P. A.

(57) ABSTRACT

Methods and systems for creating optimal time limited messages is disclosed. The server system receives a limited time message request from a first member, wherein the message request identifies a second member as the intended recipient and includes an offer. The server system accesses a member profile associated with the second member. The server system determines a message expiration time recommendation based, at least in part, on member profile data of the second member. The server system receives an expiration time selection from the first member. The server system creates a limited time message based on the received message request. The server system transmits the limited time message to the second member.

13 Claims, 12 Drawing Sheets

(56) References Cited

U.S. PATENT DOCUMENTS

| | | | | |
|---|---|---|---|---|
| 7,590,695 | B2* | 9/2009 | Landsman | H04L 51/12 709/204 |
| 7,818,680 | B2* | 10/2010 | Moody | G06Q 10/107 707/661 |
| 7,881,971 | B1* | 2/2011 | Nguyen | G06Q 30/06 705/26.7 |
| 8,082,175 | B2* | 12/2011 | Rosenberg | G06Q 30/0202 705/14.43 |
| 8,615,556 | B1* | 12/2013 | Richards | H04L 12/185 709/206 |
| 9,135,255 | B2* | 9/2015 | Pavlidis | G06Q 30/02 |
| 9,268,843 | B2* | 2/2016 | Pradhan | G06Q 30/0269 |
| 9,280,785 | B1* | 3/2016 | Jain | G06Q 30/0243 |
| 9,710,790 | B2* | 7/2017 | Taylor | G06Q 10/1053 |
| 2003/0220830 | A1* | 11/2003 | Myr | G06Q 30/0254 705/14.54 |
| 2006/0253537 | A1* | 11/2006 | Thomas | G06Q 10/107 709/206 |
| 2008/0016575 | A1* | 1/2008 | Vincent | H04L 51/14 726/26 |
| 2009/0013047 | A1* | 1/2009 | Adreon | G06Q 10/10 709/206 |
| 2010/0262452 | A1* | 10/2010 | Gibson | G06Q 10/063112 705/7.14 |
| 2010/0280879 | A1* | 11/2010 | O'Sullivan | G06Q 30/0217 705/14.19 |
| 2012/0059702 | A1* | 3/2012 | Yoder | G06Q 30/0215 705/14.17 |
| 2013/0117392 | A1* | 5/2013 | Aceves | H04L 51/30 709/206 |
| 2013/0290339 | A1* | 10/2013 | LuVogt | G06F 17/30867 707/740 |
| 2015/0288799 | A1* | 10/2015 | Carlson | H04W 4/12 455/407 |
| 2015/0324811 | A1* | 11/2015 | Courtright | G06Q 30/02 705/7.32 |
| 2015/0381533 | A1* | 12/2015 | Klemm | H04L 51/02 709/206 |
| 2016/0104096 | A1* | 4/2016 | Ovick | G06Q 10/063112 705/7.14 |
| 2016/0155138 | A1* | 6/2016 | Wang | G06Q 30/0214 705/14.16 |
| 2016/0357761 | A1* | 12/2016 | Siracusa | G06F 17/3064 |
| 2017/0300939 | A1* | 10/2017 | Chittilappilly | G06N 20/00 |

OTHER PUBLICATIONS

Chiang et al., "Optimizing time limits for maximum sales response in Internet shopping promotions", Expert Systems with Applications 38 pp. 520-526. (Year: 2011).*

Hanna et al., "Optimizing time-limited price promotions", Journal of Marketing Analytics vol. 4. (Year: 2016).*

* cited by examiner

CALCULATING EFFICIENT MESSAGING PARAMETERS

TECHNICAL FIELD

The disclosed example embodiments relate generally to the field of data analysis and, in particular, to analyzing member responses to message characteristics.

BACKGROUND

The rise of the computer age has resulted in increased access to personalized services online. As the cost of electronics and networking services drops, many services can be provided remotely over the Internet. For example, entertainment has increasingly shifted to the online space with companies such as Netflix and Amazon streaming television shows and movies to members at home. Similarly, electronic mail (email) has reduced the need for letters to be physically delivered. Instead, messages are sent over networked systems almost instantly.

Another service that can be provided over computer networks is a social networking service. Social networks allow members to communicate with each other within the context of social connections that are stored in the network. In this way, a member will send and receive information from other members with whom they have a connection.

In some example embodiments, the social networks can also allow members to contact each other without previous connections for a plurality of purposes. However, inter-member messages have varying levels of success. Improving the efficacy of inter-member messages is an important tool in improving the usefulness of the social network.

DESCRIPTION OF THE DRAWINGS

Some example embodiments are illustrated by way of example and not limitation in the figures of the accompanying drawings.

Like reference numerals refer to corresponding parts throughout the drawings.

DETAILED DESCRIPTION

Figure 1:
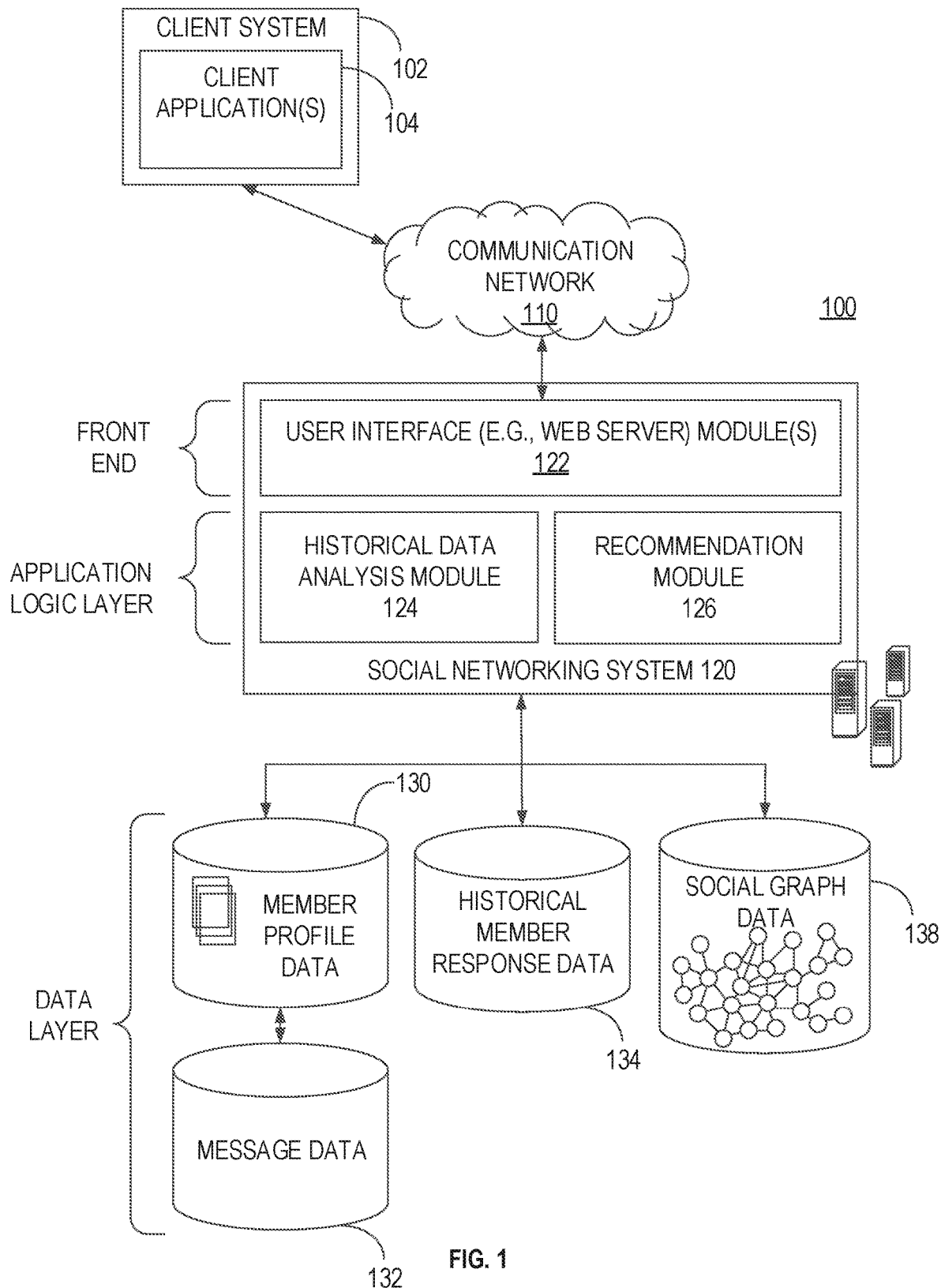
FIG. 1 is a network diagram depicting a client-server system that includes various functional components of a social networking system, in accordance with some example embodiments.

The present disclosure describes methods, systems, and computer program products for using member data to recommend effective time limits for offers. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

In some example embodiments, social networking systems provide resources and services that allow members to message each other without previous social connection. In some example embodiments, members may want to send messages that extend offers or opportunities to other members. For example, a member who is a recruiter can send messages to appropriate candidates indicating that the candidate member is a good match for a particular opportunity. In other example embodiments, an organization can send a member a message notifying the member of a special deal, discount, or general sales opportunity.

In some example embodiments, offers include, but are not limited to, job opportunities (including both actual job offers and recruiting pitches), networking opportunities between non-connected members (e.g., an invitation to become connected, exchange information, or communicate), a member to member in system mail (e.g., messages within the social networking system) or email, a sales opportunity, an advertisement opportunity, a learning opportunity (e.g., a class is starting soon), an offer for extra member benefits from the social networking system (e.g., a premium member offer), endorsement offers, recommendation offers, and other promotional offers.

However, some members have difficulty responding to offers in a timely manner. This can be true even of offers the member wishes to accept or further explore. For example, some members may put off responding to an offer until enough time has passed that it feels socially awkward to respond. Similarly, the members making the offer may not wish to have a large number of outstanding messages that include current offers. One solution to this problem is to include a time limit on any message that includes an offer.

In some example embodiments, the social networking system collects data on members and their habits for responding to messages that include offers and how time limits affect if and when the member will respond. The social networking system can use this data to create analytics that predict which members will respond positively to time limits and which time limits are the most effective. In some example embodiments, this data can be analyzed based on the characteristics of the offer (e.g., what is being offered, what actions will the recipient need to take to respond, and so on), the characteristics of the recipient member (e.g., past response history, location, demographic information, field of work, and so on), and the characteristics of the sending member (e.g., what level of experience or reputation does the sender have). The social networking system can build a robust set of probabilities that can use member data and offer data to predict the result of different time limits in encouraging the recipient member to respond.

Thus, if a first member (e.g., a member sending an offer) identifies a particular target member as the recipient of the offer, the sending member can request that the social networking system provide a recommendation for whether the sending member should include a time limit and if so, what the time limit should be. In some example embodiments, the social networking system analyzes both the recipient member and the offer message and, based on previously established models of member responses, transmits estimated member response data to the sending member. For example, the social networking system transmits data describing a series of potential time limits (e.g., one week, two weeks, or one month) and the estimated likelihood that the member will respond for each potential time limit.

In some example embodiments, the social networking system analyzes the preferences of the sending member (e.g., the member prefers a high response rate regardless of the time need or the member prefers quick responses so as to move onto other offers) and generates a recommended time limit. This recommended time limit can be transmitted to the sending member.

In some example embodiments, the social networking system receives a time limit selection from the sending member. For example, the sending member selects a particular time limit for the message. The social networking system then transmits the message to the intended recipient member.

In some example embodiments, the social networking system continues to monitor the activity of the recipient member to determine if, and when, the member responds to the message. In some example embodiments, the member fails to respond before the time limit expired. In this case, the social networking system removes the message from the inbox of the member or notifies the member that the offer has been revoked.

FIG. 1 is a network diagram depicting a client-server system environment 100 that includes various functional components of a social networking system 120, in accordance with some example embodiments. The client-server system environment 100 includes one or more client systems 102 and the social networking system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, the client system 102 is an electronic device, such as a personal computer (PC), a laptop, a smartphone, a tablet, a mobile phone, or any other electronic device capable of communication with the communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses a web browser to send and receive requests to and from the social networking system 120 and to display information received from the social networking system 120.

In some example embodiments, the client system 102 includes an application specifically customized for communication with the social networking system 120 (e.g., a LinkedIn iPhone application). In some example embodiments, the social networking system 120 is a server system that is associated with one or more services.

In some example embodiments, the client system 102 sends a request to the social networking system 120 for a webpage associated with the social networking system 120. For example, a member uses the client system 102 to log into the social networking system 120 and to identify one or more candidate members based on a set of criteria. The member can then choose to send a message to one of the identified candidate members. In some example embodiments, the social networking system 120 recommends a time limit for the offer included in the message. The client system 102 receives the recommend time limit and can respond as desired.

In some example embodiments, as shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a social networking system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the social networking system 120 is depicted in FIG. 1 as having a three-tiered architecture, the various example embodiments are by no means limited to this architecture.

As shown in FIG. 1, the front end consists of a user interface module (e.g., a web server) 122, which receives requests from various client systems 102 and communicates appropriate responses to the requesting client systems 102. For example, the user interface module(s) 122 may receive requests in the form of Hypertext Transfer Protocol (HTTP) requests, or other web-based, application programming interface (API) requests. The client system 102 may be executing conventional web browser applications or applications that have been developed for a specific platform to include any of a wide variety of mobile devices and operating systems.

As shown in FIG. 1, the data layer includes several databases, including databases for storing data for various members of the social networking system 120, including member profile data 130, message data 132, historical member response data 134, and social graph data 138, which is data stored in a particular type of database that uses graph structures with nodes, edges, and properties to represent and store data. Of course, in various alternative example embodiments, any number of other entities might be included in the social graph (e.g., companies, organizations, schools and universities, religious groups, non-profit organizations, governmental organizations, non-government organizations (NGOs), and any other group) and, as such, various other databases may be used to store data corresponding with other entities.

Consistent with some example embodiments, when a person initially registers to become a member of the social networking system 120, the person will be prompted to provide some personal information, such as his or her name, age (e.g., birth date), gender, contact information, home town, address, educational background (e.g., schools, majors, etc.), current job title, job description, industry, employment history, skills, professional organizations, memberships with other online service systems, and so on. This information is stored, for example, in the member profile data 130.

In some example embodiments, the member profile data 130 includes or is associated with the member interaction data. In other example embodiments, the member interaction data is distinct from, but associated with, the member profile data 130. The member interaction data stores data detailing the various interactions each member has through the social networking system 120. In some example embodiments, interactions include posts, likes, messages, adding or removing social contacts, and adding or removing member content items (e.g., a message or like), while others are general interactions (e.g., posting a status update) and are not related to another particular member. Thus, if a given member interaction is directed towards or includes a specific member, that member is also included in the membership interaction record.

In some example embodiments, the member profile data 130 includes message data 132. In some example embodiments, message data 132 includes one or more messages that have been received from other parties, including other members, organizations, the social networking system 120 itself, and so on. In some example embodiments, the message data 132 includes offers with a time limit. In some example embodiments, the messages with time limits are evaluated to determine whether the time limits have expired. If so, the messages may be removed from the message data 132.

In some example embodiments, the historical member response data 134 include records for each message received by members (e.g., including the topics of the messages, the sender, and the included offers), whether the members responded to the message, how long the member took to respond, and whether there was a time limit.

Once registered, a member may invite other members, or be invited by other members, to connect via the social networking system 120. A "connection" may include a bilateral agreement by the members, such that both members acknowledge the establishment of the connection. Similarly, in some example embodiments, a member may elect to "follow" another member. In contrast to establishing a "connection," the concept of "following" another member typically is a unilateral operation and, at least in some example embodiments, does not include acknowledgement or approval by the member that is being followed. When one member follows another, the member who is following may receive automatic notifications about various interactions undertaken by the member being followed. In addition to following another member, a member may elect to follow a company, a topic, a conversation, or some other entity, which may or may not be included in the social graph. Various other types of relationships may exist between different entities, and are represented in the social graph data 138.

The social networking system 120 may provide a broad range of other applications and services that allow members the opportunity to share and receive information, often customized to the interests of the member. In some example embodiments, the social networking system 120 may include a photo sharing application that allows members to upload and share photos with other members. As such, at least in some example embodiments, a photograph may be a property or entity included within a social graph. In some example embodiments, members of the social networking system 120 may be able to self-organize into groups, or interest groups, organized around a subject matter or topic of interest. In some example embodiments, the data for a group may be stored in a database. When a member joins a group, his or her membership in the group will be reflected in the member profile data 130 and the social graph data 138.

In some example embodiments, the application logic layer includes various application server modules, which, in conjunction with the user interface module(s) 122, generate various user interfaces (e.g., web pages) with data retrieved from various data sources in the data layer. In some example embodiments, individual application server modules are used to implement the functionality associated with various applications, services, and features of the social networking system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

A historical data analysis module 124 and/or a recommendation module 126 can also be included in the application logic layer. Of course, other applications or services that utilize the historical data analysis module 124 or the recommendation module 126 may be separately implemented in their own application server modules.

As illustrated in FIG. 1, in some example embodiments, the historical data analysis module 124 and the recommendation module 126 are implemented as services that operate in conjunction with various application server modules. For instance, any number of individual application server modules can invoke the functionality of the historical data analysis module 124 and the recommendation module 126. However, in various alternative example embodiments, the historical data analysis module 124 and the recommendation module 126 may be implemented as their own application server modules such that they operate as standalone applications.

Generally, the historical data analysis module 124 accesses historical member response data 134, including a record for each message sent to members of the social networking system 120 and whether or not the receiving member responded to the message. In some example embodiments, the historical data analysis module 124 then generates analytics that represent the likelihood of receiving a response based on data about the message and offer, the receiving member, and the sending member.

For example, the analytics can determine average response rates for different offer types, such as recruiting offers, discount offers, free trial offers, and so on. Indeed, the analytics can also analyze these offer types more deeply such that recruiting offers, for example, can be further subdivided based on job title, required experience, location, and so on. Analytics can also be generated by the age, experience, educational history, past message response rate, demographic information, location, usage rate of the social networking system 120, and so on.

Similarly, the historical data analysis module 124 can analyze aspects of the sending member to determining a likely response rate. For example, recruiters who work in a law office may expect a different response rate than sales managers for a paper company. In this way, the recommended time limit for a given message may be determined based on a variety of factors that are given for any given set of message, sender, and receiver.

In some example embodiments, the historical data analysis module 124 generates a model for generating a response likelihood. For example, the social networking system (e.g., the server 120 in FIG. 1) can create a database that stores, for each member, a determined percentage of offers that the member has responded to. Such a database is constructed by analyzing the plurality of stored messages and member responses and, for each member, calculating the ratio of messages received and responses sent.

In some example embodiments, the database has additional fields, allowing a percentage of responses to be determined based on whether the received messages included offers, what type of offer was included in the message, whether the message included a time limit, and what the time limit was. Thus, by querying the database the social networking system (e.g., the server 120 in FIG. 1) can determine statistics for any combination of those fields.

For example, the social networking system (e.g., the server 120 in FIG. 1) queries the database to determine how likely member A is to respond to a sales offer. After querying the database the social networking system (e.g., the server 120 in FIG. 1) is able to determine that for offers without a time limit, member A responded to 0 of 11 messages, for offers with a one week time limit, Member A responded to 4 of 5 offers, and for offers with a two-week time limit, Member A responded in 2 of 5 offers.

Additionally, the database can include member data that allows the social networking system (e.g., the server 120 in FIG. 1) to group members based on similarities and generate average response rates. For example, for each member, the database could include the members location, age, work history, educational history, title, and so on. Using these additional fields, the social networking system (e.g., the server 120 in FIG. 1) can query the database to determine how likely a member who is female, between the ages of 23- and 27, employed full-time, and living in California is to respond to an offer to sell a smart phone. The database can then identify the members who meet the criteria and calculate an average response rate based on the historical response rate of matching members to similar members.

In some example embodiments, the model is generated using computer learning techniques and trained using historical member response data 134.

In some example embodiments, the social networking system (e.g., the server 120 in FIG. 1) uses a computer learning model to create a model based on the plurality of stored messages and member responses. In some example embodiments, the model is created using a deep learning or neural network learning method. In some example embodiments, the social networking system (e.g., the server 120 in FIG. 1) model uses the entire corpus of past messages and responses to identify relationships between the messages, the offers they contain, member information, and whether the member responds to the message. In some example embodiments, the relationships can be based on frequency co-occurrence of terms (e.g., with a large enough body of documents, determining which terms occur in the same documents can enable a model to effectively generate connections between messages, offers, and time limits and the likelihood of a member responding to the message. In some example embodiments, the important of terms is weighted by an inverse frequency score.

In other example embodiments, a model is trained by determining the likelihood of response using a neural network. In this example, the neural network takes inputs (e.g., the content of the message, the offer included, if any, the content of the offer, the time limit of the offer, if any, information about the sending member, information about the receiving member). Each of these inputs is given a weight and passed to a plurality of hidden nodes. The hidden nodes exchange information, also given weights, to produce an output. In some example embodiments, there are several layers of hidden nodes.

Once the model is trained, data associated with a particular message can be input into the model as input (e.g., as seen above the input data from a particular member includes data about the sending member, data about the receiving member, and data about the message (and offer) itself). The output from the model is a likelihood score that the receiving member will respond to the receiving message. In some example embodiments, the estimated likelihood of response is a value between 0 and 1 wherein 0 represents no likelihood of response and 1 represents a certain response.

In some example embodiments, the model generates a list of estimated likelihood responses, one for each potential time limit. For example, Message A and its related information is entered into the model. The model then generates a series of values, each of which represents a different potential time limit and its corresponding estimate likelihood of a response from the intended recipient.

In some example embodiments, the model is trained using existing data (e.g., messages and responses) and the neural network learning algorithm adaptively adjusts the node weights to produce an estimated likelihood of response that matches existing records. In some example embodiments, when new messages are received, the model is updated with the new data.

In some example embodiments, the recommendation module 126 analyzes a message offer and determines a particular suggested time limit for an offer. For example, using the analytics data produced by the historical data analysis module 124, the recommendation module 126 calculates the likely response rate for the offer using a plurality of potential time limits.

As noted above, in some cases a table of past response outcomes can be used to generates the estimated likelihood. In other example embodiments, a model can be trained that will take the message and related information as input, and generate estimated likelihood value for each potential time limit.

For example, the recommendation module 126 determines that the message offer is a discount offer on a film and is directed to a male customer between the ages of 18 and 21 that lives in Seattle. The recommendation module 126 then evaluates 5 potential time limits based on these inputs. Using a database of historic response data, the recommendation module 126 determines that historically, offers with these characteristics sent to members with these characteristics has a response rate of 12% when given a time limit of 1 day, a response rate of 25% when given a time limit of 1 week, a response rate of 26 percent when given a time limit of 2 weeks, a response rate of 17% percent when given a time limit of 1 month, and a response rate of 9% when given a time limit of 6 months.

In some example embodiments, the recommendation module 126 then selects the time limit with the highest likelihood of response. In other example embodiments, the sending member can select the longest acceptable time limit and the recommendation module 126 selects the best response rate for time limits that are within the longest acceptable time limit.

In some example embodiments, the recommendation module 126 transmits a list of potential time limits and their associated likelihood of provoking a response to the sending member. In some example embodiments, the sending member selects one of the suggested time limits and transmits the selected time limit back to the social networking system 120. In some example embodiments, the recommendation module 126 then transmits the message and the offer to the intended recipient member.

Figure 2:
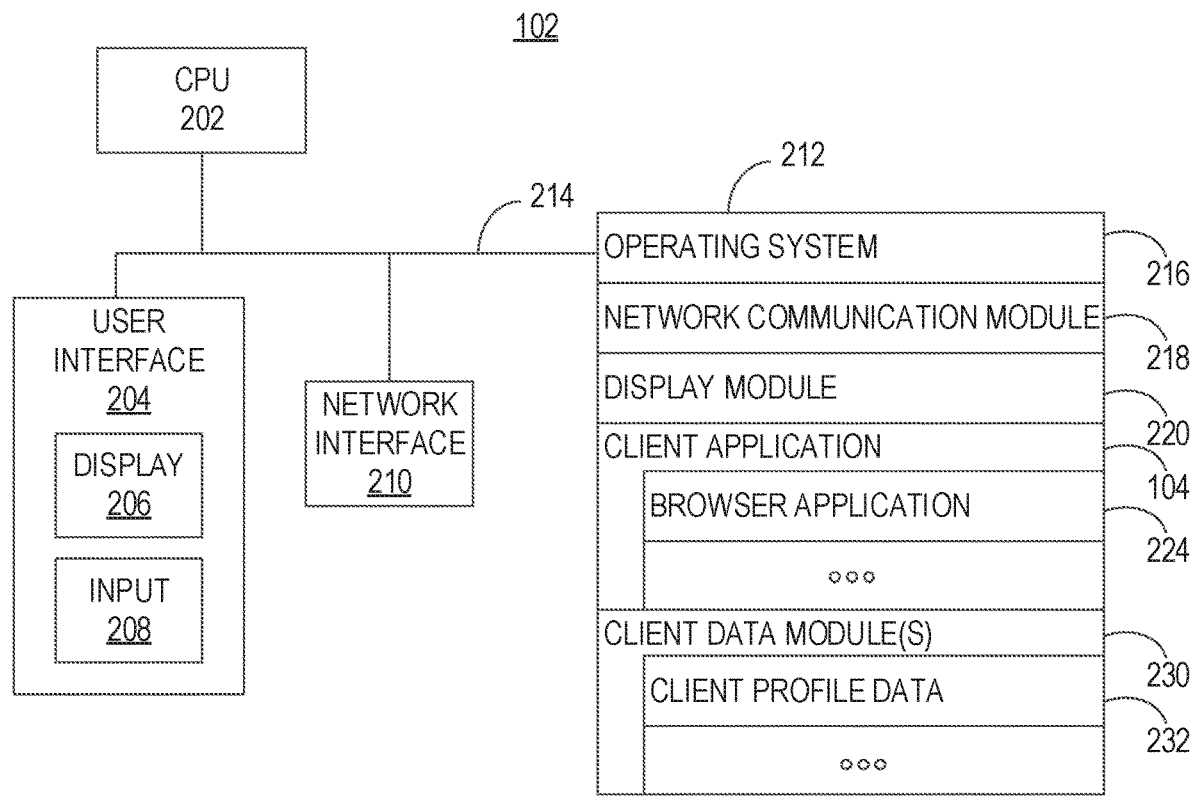
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means 208 such as a keyboard, a mouse, a touch sensitive display, or other input buttons. Furthermore, some client systems 102 use a microphone and voice recognition to supplement or replace the keyboard.

The memory 212 includes high-speed random-access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:
- an operating system 216 that includes procedures for handling various basic system services and for performing hardware-dependent tasks;
- a network communication module 218 that is used for connecting the client system 102 to other computers via the one or more network interfaces 210 (wired or wireless) and one or more communication networks 110, such as the Internet, other WANs, LANs, metropolitan area networks (MANs), etc.;
- a display module 220 for enabling the information generated by the operating system 216 and client application(s) 104 to be presented visually on the display device 206;
- one or more client applications 104 for handling various aspects of interacting with the social networking system 120, including but not limited to:
  - a browser application 224 for requesting information from the social networking system 120 (e.g., time limit recommendations) and receiving responses from the social networking system 120; and
- client data module(s) 230 for storing data relevant to clients, including but not limited to:
  - client profile data 232 for storing profile data related to a member of the social networking system 120 associated with the client system 102.

Figure 3:
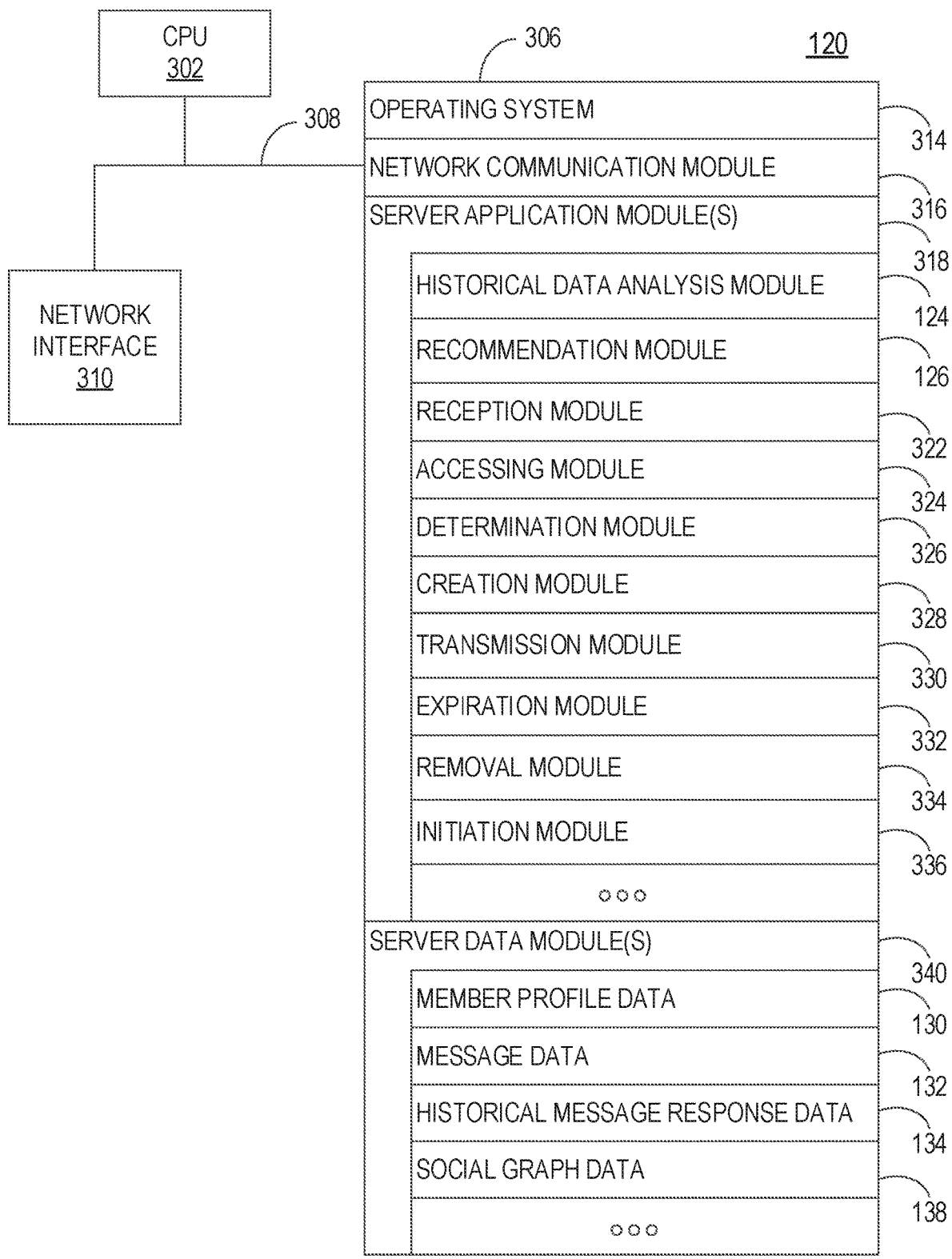
FIG. 3 is a block diagram illustrating a social networking system, in accordance with some example embodiments.

FIG. 3 is a block diagram further illustrating the social networking system 120, in accordance with some example embodiments. Thus, FIG. 3 is an example embodiment of the social networking system 120 in FIG. 1. The social networking system 120 typically includes one or more CPUs 302, one or more network interfaces 310, memory 306, and one or more communication buses 308 for interconnecting these components. The memory 306 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternatively the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:
- an operating system 314 that includes procedures for handling various basic system services and for performing hardware-dependent tasks;
- a network communication module 316 that is used for connecting the social networking system 120 to other computers via the one or more network interfaces 310 (wired or wireless) and one or more communication networks 110, such as the Internet, other WANs, LANs, MANs, and so on;
- one or more server application modules 318 for performing the services offered by the social networking system 120, including but not limited to:
  - a historical data analysis module 124 for gathering historical information about member response to messages (and specifically to messages that include offers) and whether time limits to messages increased the likelihood of a response based on information in the historical member response data 134;
  - a recommendation module 126 for identifying a particular time limit that is determined as the most likely time limit for eliciting a member response;
  - a reception module 322 for receiving requests from members of the social networking system 120;
  - an accessing module 324 for accessing a member profile associated with a target member, wherein the target member is a member that a source member has identified as a target for a message;
  - a determination module 326 for a message expiration time recommendation based, at least in part, on member profile data 130 of the target member;
  - a creation module 328 for creating a time limited opportunity message based on the received message request;
  - a transmission module 330 for transmitting a created time-limited opportunity message to an intended target member, including a notification on the time-limited nature of the opportunity message;
  - an expiration module 332 for determining whether a time limited opportunity has expired based on a comparison of the current time, the time the message was sent, and the length of the time limit;
  - a removal module 334 for removing an expired message from an inbox associated with the member; and an initiation module 336 for beginning a timer associated with the time-limited opportunity message in response to determining an initiation signal (such as the member opening the message for the first time or seeing the message in the inbox); and server data module(s) 340, holding data related to the social networking system 120, including but not limited to:

member profile data 130, including both data provided by the member, who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on the member's activity, social graph data 138, overall trend data for the social networking system 120, and so on;

message data 132 including data describing each message that each member has received from other members of the social networking system 120;

historical message response data 134 including data describing past messages in the social networking system 120 and any response which members sent in response to the messages; and social graph data 138 including data that represents members of the social networking system 120 and the social connections between them.

Figure 4:
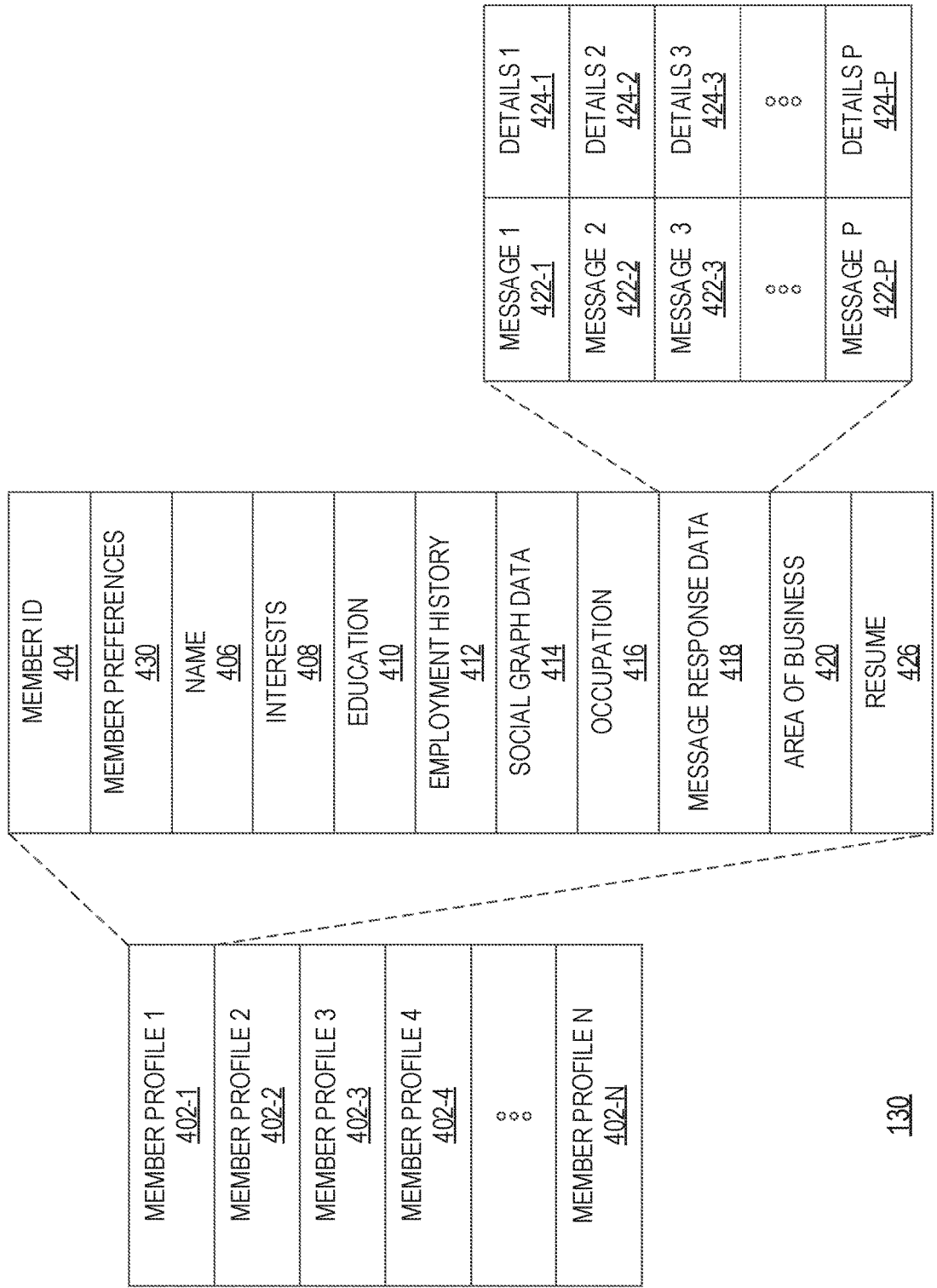
FIG. 4 is a block diagram of an exemplary data structure for member profile data, in accordance with some example embodiments.

FIG. 4 is a block diagram of an exemplary data structure for the member profile data 130 for storing member profiles, in accordance with some example embodiments. In accordance with some example embodiments, the member profile data 130 includes a plurality of member profiles 402-1 to 402-N, each of which corresponds to a member of the social networking system 120.

In some example embodiments, a respective member profile 402 stores a unique member ID 404 for the member profile 402, one or more member preferences 430 for the member (e.g., whether they prioritize response rate or response time), a name 406 for the member (e.g., the member's legal name), member interests 408, member education history 410 (e.g., the high school and universities the member attended and the subjects studied), employment history 412 (e.g., the member's past and present work history with job titles), social graph data 414 (e.g., a listing of the member's relationships as tracked by the social networking system 120), occupation 416, message response data 418, area of business 420 (e.g., the area of technology or business that the member is interested in or works in), and a detailed member resume 426.

In some example embodiments, the message response data 418 include a list of messages 422-1 to 422-P (each message the member has received through the social networking system (e.g., the system 120 in FIG. 1). Each message record includes the content of the message and one or more associated details 424-1 to 424-P. Message details include the source of the message 422, the occupation of the sender, the offer type (e.g., sales offer, employment offer, and so on), whether the message 422 included a time limit and if so, what the time limit was, whether the member responded to the message 422, and if so, what the response was, and whether the message 422 included an offer and, if so, what the offer was.

Figure 5:
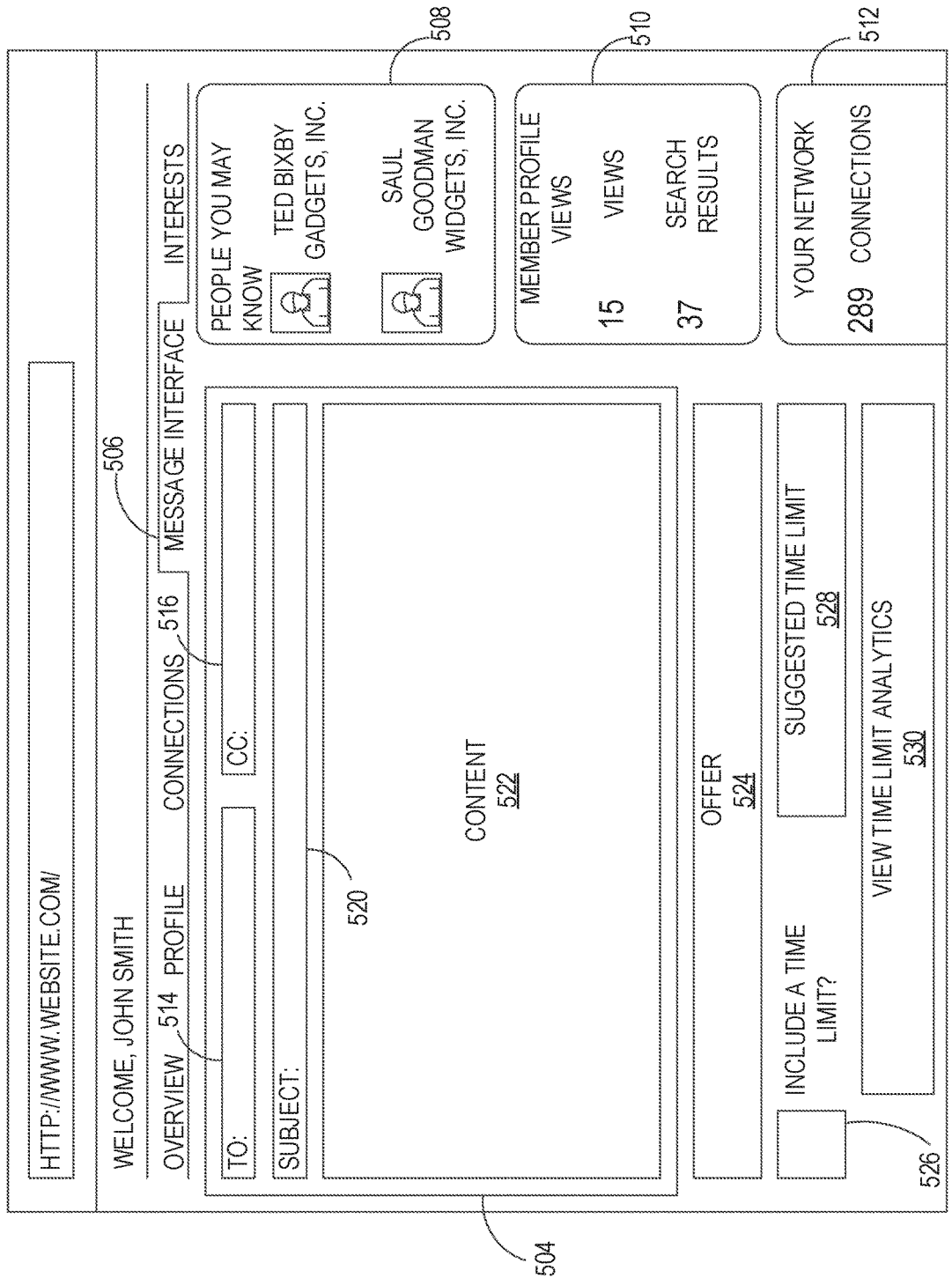
FIG. 5 is a user interface diagram illustrating an example of a web page that incorporates an interface for creating a message with a time limit.

FIG. 5 is a user interface diagram illustrating an example of a user interface 500 or web page that allows a message 422 to be created and a time limit to be chosen for a message service provided by a social networking system (e.g., the system 120 in FIG. 1). In the example user interface 500 of FIG. 5A, the displayed user interface 500 represents a web page for a member of the social networking service with the name John Smith.

As can be seen, a messaging interface tab 506 has been selected and an interface for composing a message 504 is displayed. The message composing interface includes a to field 514, a cc field 516 a subject field 520, a content area 522, an area to detail a specific offer 524, a checkbox 526 that allows the member to include a time limit, an area that displays a suggested time limit 528, and a button that allows the member to view analytics for various possible time limits 530.

The user interface 500 also includes information in side sections of the user interface 500 including a contact recommendation section 508, a profile viewership statistic section 510, and a social graph statistic section 512.

Figure 6:
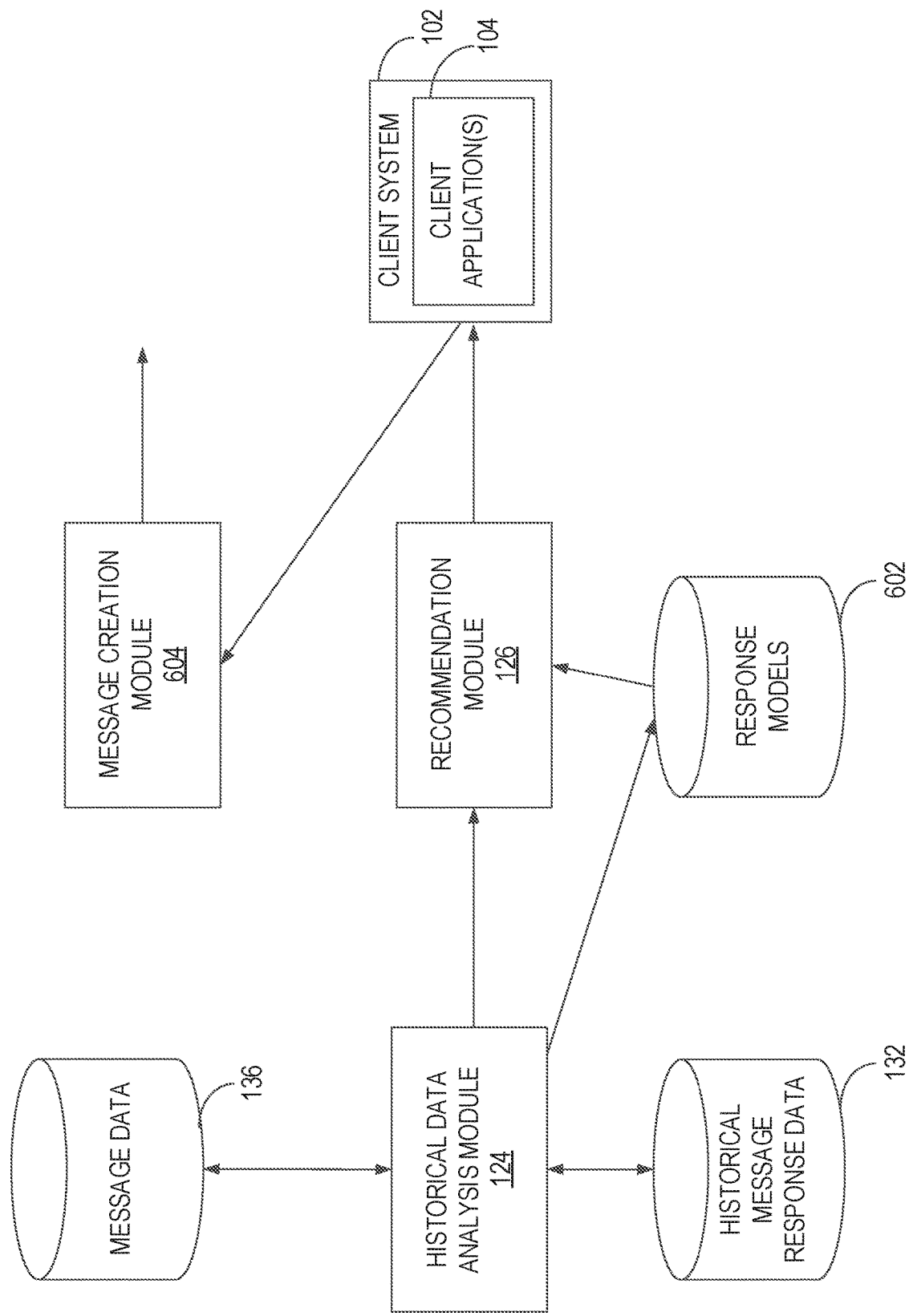
FIG. 6 is a flow diagram illustrating a method, in accordance with some example embodiments, for generating a recommended time limit for a message that includes an offer.

FIG. 6 is a flow diagram illustrating a method, in accordance with some example embodiments, for generating a recommended time limit for a message 422 that includes an offer. Each of the operations shown in FIG. 6 may correspond to instructions stored in a computer memory or computer-readable storage medium. In some embodiments, the method described in FIG. 6 is performed by a social networking system (e.g., the system 120 in FIG. 1). However, the method described can also be performed by any other suitable configuration of electronic hardware.

In some embodiments, the method is performed by a social networking system (e.g., the system 120 in FIG. 1) including one or more processors and memory storing one or more programs for execution by the one or more processors.

In some example embodiments, the historical data analysis module 124 analyzes data from past member interactions with the social networking system (e.g., the system 120 in FIG. 1). Specifically, the historical data analysis module 124 accesses data stored in the message data 132 to identify a plurality of messages 422 that have been sent from one member of the social networking system (e.g., the system 120 in FIG. 1) to another member of the social networking system (e.g., the system 120 in FIG. 1). In addition, the historical data analysis module 124 accesses historical message response data 134 to determine, for each message 422, whether the receiving member responded to the member and, if so, how long the response took. This can also be analyzed to determine which of the messages 422 had time limits and what the duration of the time limits was.

In some example embodiments, the historical data analysis module 124 uses the data from past responses to build models or classifiers that predict the likelihood of a response to an offer made in a message 422 for a variety of potential variables including but not limited to the targeted member (e.g., if there is sufficient data to predict a particular member's response), demographic information about the target member, the type or kind of offer, the sending member, the time limit, and so on.

In some example embodiments, response models are generated by using computer learning techniques and trained based on existing response data. In some example embodiments, the models (or information that enable the models) can be stored in response model database 602. In some example embodiments, the recommendation module 126 accesses the response models database 602 when a member prepares to send a message 422 (especially one that includes an offer) and a recommended time limit is requested.

The recommendation module 126 then accesses the response models database 602 and prepares a series of response likelihoods for search of one or more potential time limits. For example, the recommendation module 126 estimates, for a series of time frames (one week, two weeks, and one month), the likelihood that the receiving member will respond. In some example embodiments, the recommendation module 126 selects the time frame with the highest likelihood of a member response from the target member.

In some example embodiments, the recommendation module 126 transmits the recommended time limit to the client system 102. In some example embodiments, the client system (e.g., the client system 102 in FIG. 1) displays the recommended time limit to the sending member in a webpage, a user interface of an application customized to interact with the social networking system (e.g., the system 120 in FIG. 1), or other interface.

In some example embodiments, the sending member selects either the recommended time limit or another time limit of the member's choosing (or no time limit) and that selection is transmitted back to the message creation module 604.

In some example embodiments, the message creation module 604 then generates a message 422 including an offer (selected by the sending member) and a time limit (also selected by the sending member) and makes the messages 422 available to the target member. In some example embodiments, the message 422 is sent as an email. In other example embodiments, the message 422 is entered into a message inbox associated with the social networking system (e.g., the system 120 in FIG. 1) and the target member is notified.

Figure 7:
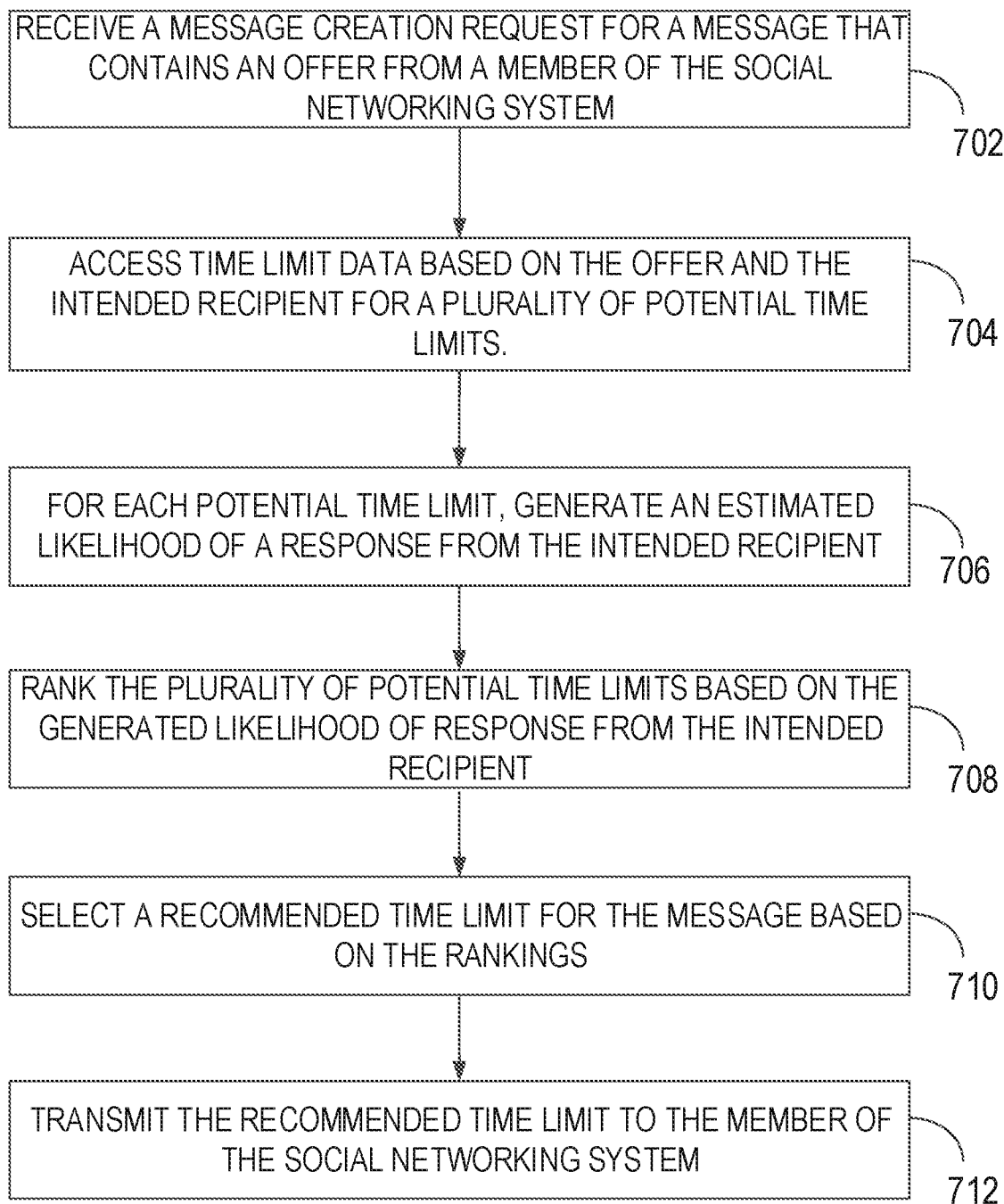
FIG. 7 is a flow diagram illustrating a method, in accordance with some example embodiments, for generating a recommended time limit for a message that includes an offer.

FIG. 7 is a flow diagram illustrating a method, in accordance with some example embodiments, for generating a recommended time limit for a message 422 that includes an offer. Each of the operations shown in FIG. 7 may correspond to instructions stored in a computer memory or computer-readable storage medium. Optional operations are indicated by dashed lines (e.g., boxes with dashed-line borders). In some embodiments, the method described in FIG. 7 is performed by the social networking system (e.g., the system 120 in FIG. 1). However, the method described can also be performed by any other suitable configuration of electronic hardware.

In some embodiments, the method is performed by a social networking system (e.g., the system 120 in FIG. 1) including one or more processors and memory storing one or more programs for execution by the one or more processors.

In some example embodiments, the social networking system (e.g., the system 120 in FIG. 1) receives (702) a message creation request for a message 422 that contains an offer from a member of the social networking system (e.g., the system 120 in FIG. 1). For example, a member of the social networking system (e.g., the system 120 in FIG. 1), such as a recruiter, has an offer that the member wants to send to another member of the social networking system (e.g., the system 120 in FIG. 1). To send such a message 422, the member selects a message sending interface of the social networking system (e.g., the system 120 in FIG. 1). In some example embodiments, the interface is provided via a webpage form or an application accessible through a smartphone.

In some example embodiments, the member clicks on a link in the webpage and the social networking system (e.g., the system 120 in FIG. 1) responds by transmitting an interface for a message creation request. The member then fills out the form, including an offer (e.g., the specific deal or offer that will expire wen the time runs out), message content (e.g., any media content included in the message to explain or highlight the offer or its value), and an intended recipient. In some example embodiments, the details of the message 422 are transmitted to the social networking system (e.g., the system 120 in FIG. 1) prior to the member clicking on the send message link.

In response to receiving a message creation request, the social networking system (e.g., the system 120 in FIG. 1) accesses (704) time limit data for a plurality of potential time limits based on the content of the message, the offer, and the intended recipient. For example, the social networking system (e.g., the system 120 in FIG. 1) analyzed a plurality of stored messages and member responses to develop analytics that allow the social networking system (e.g., the system 120 in FIG. 1) to estimate to the likelihood that a member will respond to a given message 422 with an offer.

For example, the social networking system (e.g., the server 120 in FIG. 1) can create a database that stores, for each member, a determined percentage of offers that the member has responded to. Such a database is constructed by analyzing the plurality of stored messages and member responses and, for each member, calculating the ratio of messages received and responses sent.

In some example embodiments, the database has additional fields, allowing a percentage of responses to be determined based on whether the received messages included offers, what type of offer was included in the message, whether the message included a time limit, and what the time limit was. Thus, by querying the database the social networking system (e.g., the server 120 in FIG. 1) can determine statistics for any combination of those fields.

For example, the social networking system (e.g., the server 120 in FIG. 1) queries the database to determine how likely member A is to respond to a sales offer. After querying the database the social networking system (e.g., the server 120 in FIG. 1) is able to determine that for offers without a time limit, member A responded to 0 of 11 messages, for offers with a one week time limit, Member A responded to 4 of 5 offers, and for offers with a two-week time limit, Member A responded in 2 of 5 offers.

Additionally, the database can include member data that allows the social networking system (e.g., the server 120 in FIG. 1) to group members based on similarities and generate average response rates. For example, for each member, the database could include the members location, age, work history, educational history, title, and so on. Using these additional fields, the social networking system (e.g., the server 120 in FIG. 1) can query the database to determine how likely a member who is female, between the ages of 23- and 27, employed full-time, and living in California is to respond to an offer to sell a smart phone. The database can then identify the members who meet the criteria and calculate an average response rate based on the historical response rate of matching members to similar members.

In some example embodiments, the social networking system (e.g., the server 120 in FIG. 1) uses a computer learning model to create a model based on the plurality of stored messages and member responses. In some example embodiments, the model is created using a deep learning or neural network learning method. In some example embodiments, the social networking system (e.g., the server 120 in FIG. 1) model uses the entire corpus of past messages and responses to identify relationships between the messages, the offers they contain, member information, and whether the member responds to the message. In some example embodiments, the relationships can be based on frequency co-occurrence of terms (e.g., with a large enough body of documents, determining which terms occur in the same documents can enable a model to effectively generate connections between messages, offers, and time limits and the likelihood of a member responding to the message. In some example embodiments, the important of terms is weighted by an inverse frequency score.

In other example embodiments, a model is trained by determining the likelihood of response using a neural network. In this example, the neural network takes inputs (e.g., the content of the message, the offer included, if any, the content of the offer, the time limit of the offer, if any, information about the sending member, information about the receiving member). Each of these inputs is given a weight and passed to a plurality of hidden nodes. The hidden nodes exchange information, also given weights, to produce an output. In some example embodiments, there are several layers of hidden nodes.

Once the model is trained, data associated with a particular message can be input into the model as input (e.g., as seen above the input data from a particular member includes data about the sending member, data about the receiving member, and data about the message (and offer) itself). The output from the model is a likelihood score that the receiving member will respond to the receiving message. In some example embodiments, the estimated likelihood of response is a value between 0 and 1 wherein 0 represents no likelihood of response and 1 represents a certain response.

In some example embodiments, the model generates a list of estimated likelihood responses, one for each potential time limit. For example, Message A and its related information is entered into the model. The model then generates a series of values, each of which represents a different potential time limit and its corresponding estimate likelihood of a response from the intended recipient.

In some example embodiments, the model is trained using existing data (e.g., messages and responses) and the neural network learning algorithm adaptively adjusts the node weights to produce an estimated likelihood of response that matches existing records. In some example embodiments, when new messages are received, the model is updated with the new data.

For each potential time limit, the social networking system (e.g., the system 120 in FIG. 1) generates (706) an estimated likelihood of a response from the intended recipient. As noted above, in some cases a table of past response out comes can be used to generates the estimated likelihood. In other example embodiments, a model can be trained that will the message and related information as input, and generate estimated likelihood value for each potential time limit.

For example, the list of potential time limits includes five days, ten days, two weeks, and a month. The likelihood is a number between 0 and 1 and the list of potential time limits are 0.3, 0.4, 0.65, and 0.55 respectfully.

In some example embodiments, the social networking system (e.g., the system 120 in FIG. 1) ranks (708) the plurality of potential time limits based on the generated likelihood of response from the intended recipient. Thus, the potential time limit that has the highest likelihood of response is ranked first and so on until the lowest likelihood of response is ranked last.

In some example embodiments, the social networking system (e.g., the system 120 in FIG. 1) selects (710) a recommended time limit for the message 422 based on the rankings. In some example embodiments, the time limit with the highest estimated likelihood of response will be selected. In other example embodiments, the preferences of the sending member result in a different time limit being select. For example, if the member prefers responses within one week, the social networking system (e.g., the server 120 in FIG. 1) will select the time limit that has the highest estimated likelihood of response while also being less than or equal to one week, whether or not a higher time limit exceeding one week would have a higher estimated likelihood of response.

Once a recommend time limit has been selected, the social networking system (e.g., the system 120 in FIG. 1) transmits (712) the recommended time limit to the member of the social networking system (e.g., the system 120 in FIG. 1) for display.

Figure 8A:
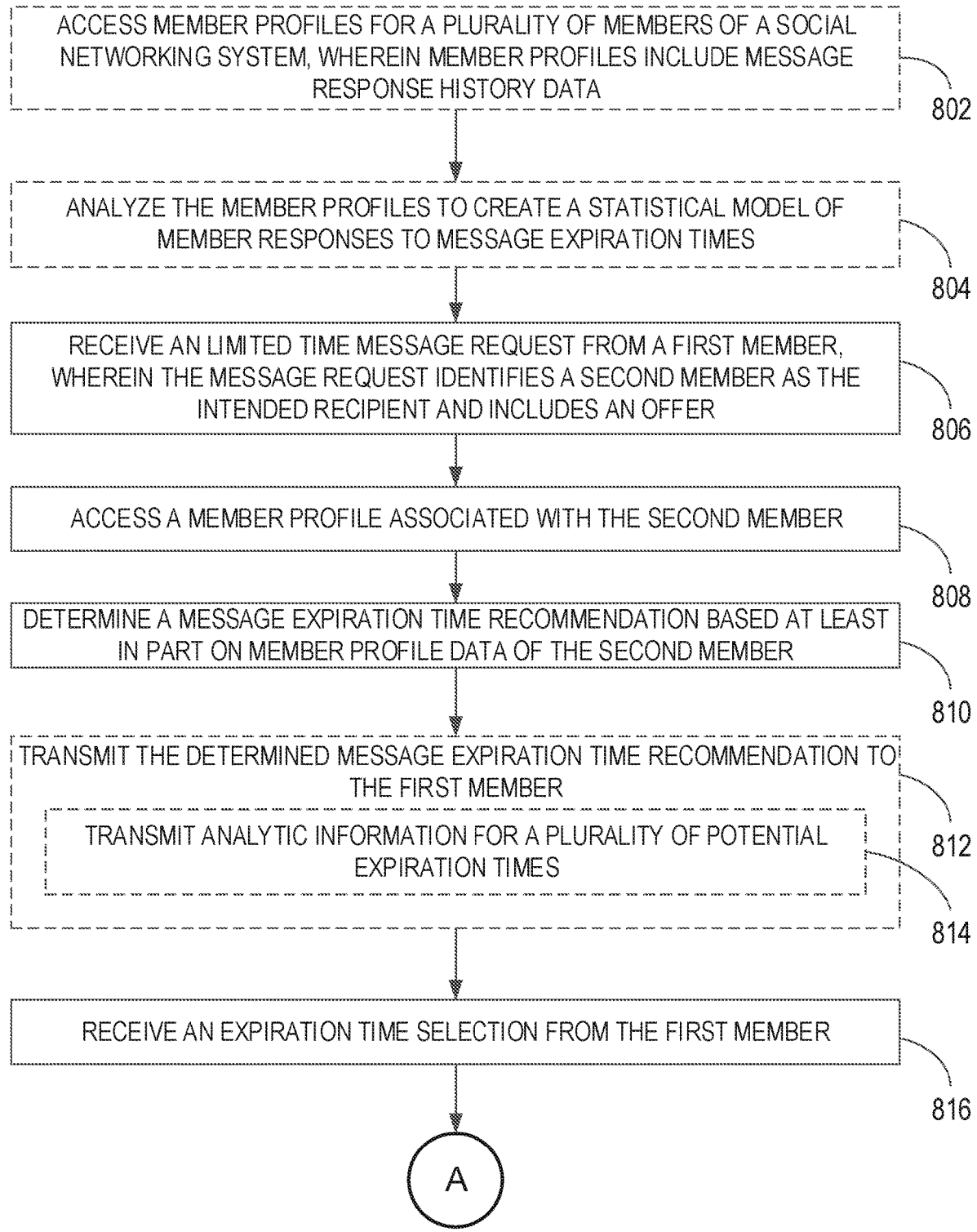
FIGS. 8A-8C are flow diagrams illustrating a method, in accordance with some example embodiments, for generating a recommended time limit for a message that includes an offer.

FIG. 8A is a flow diagram illustrating a method, in accordance with some example embodiments, for generating a recommended time limit for a message 422 that includes an offer. Each of the operations shown in FIG. 8A may correspond to instructions stored in a computer memory or computer-readable storage medium. Optional operations are indicated by dashed lines (e.g., boxes with dashed-line borders). In some embodiments, the method described in FIG. 8A is performed by the social networking system (e.g., the system 120 in FIG. 1). However, the method described can also be performed by any other suitable configuration of electronic hardware.

In some embodiments, the method is performed by a social networking system (e.g., the system 120 in FIG. 1) including one or more processors and memory storing one or more programs for execution by the one or more processors.

In some example embodiments, the social networking system (e.g., the system 120 in FIG. 1) accesses (802) member profiles 402 for a plurality of members of a social networking system 120, wherein member profiles 402 include message response history data. For example, the social networking system (e.g., the system 120 in FIG. 1) stores a database of member profiles 402. Each member profile 402 includes data about the member as well as messages 422 that the member has sent and received. The social networking system (e.g., the system 120 in FIG. 1) can analyze the response data for a plurality of members.

In some example embodiments, the social networking system (e.g., the system 120 in FIG. 1) analyzes (804) the member profiles 402 to create a statistical model of member responses to message expiration times. For example, this statistical model can be created by querying a database using the factors that are needed for the statistical model. In other example embodiments, the model is built using computer learning techniques, as described above (e.g., support vector machines, neural networks, or any other appropriate technique). Once the model is created, it takes data concerning the sending member, the message content, the offer, and the receiving member as input and uses that input to predict the likelihood of member response for a plurality of expiration times.

The social networking system (e.g., the system 120 in FIG. 1) receives (806) a limited time message request from a first member, wherein the message request identifies a second member as the intended recipient and includes an offer. For example, the first member wants to send a message 422 to the first member. To do so, the first member accesses the services provided by the social networking system (e.g., the system 120 in FIG. 1) (e.g., through a webpage or customized application). A messaging interface is presented to the first member and the first member enters information for the message 422 including the content of the message 422, the offer, the intended recipient, and so on. In some example embodiments, the data entered by the first member is transmitted by the client system (e.g., the client system 102 in FIG. 1) as it is entered by the first member. In other example embodiments, the data is only transmitted when the first member selects a send data button.

In some example embodiments, a first member notifies the social networking system (e.g., the system 120 in FIG. 1) that they would like to send an offer to members with a particular response time record. For example, the first member has an opportunity that will be gone within a week (e.g., a concern scheduled within a week). The first member requests the social networking system (e.g., the system 120 in FIG. 1) to identify one or more members who typically respond to offers within the given time limit.

The social networking system (e.g., the system 120 in FIG. 1) uses its analyzed data to identify one or more members who are likely to respond (either positively or negatively) within the given time limit. The social networking system (e.g., the system 120 in FIG. 1) can then present this list of members to the first member. The first member can select one or more of the suggested members as members to receive the time-limited offer. In this way, a first member can use the member response metrics to filter potential recipients based on the likelihood that they their past offer response times.

In some example embodiments, the social networking system (e.g., the system 120 in FIG. 1) accesses (808) a member profile 402 associated with the second member. For example, the social networking system (e.g., the system 120 in FIG. 1) determines a target (or recipient) member for the message 422. In response, the social networking system (e.g., the system 120 in FIG. 1) accesses a database of member profiles 402 and identifies the member profile 402 of the second member.

In some example embodiments, the social networking system (e.g., the system 120 in FIG. 1) determines (810) a message expiration time recommendation based, at least in part, on member profile data 130 of the second member. As noted above, the message expiration time recommendation can be generated using a model that estimates the likelihood of a member response to an offer for a plurality of different expiration times. This model takes data as input, including but not limited to, the type of offer, the content of the message 422 (e.g., keywords in the message), the response history of the sending member, the response history of the receiving member, the location of the sender and the receiver, the number of inbound offers the receiving member receives, the field of work that the receiving member is associated with, the receiving members' work history, the receiving members' current occupation, demographic information associated with the member, and so on.

This data is entered into the model and the model generates a series of response likelihood scores for a number of potential time expiration lengths. For example, the model will generate likely response scores for five different expiration times (three days, one week, two weeks, one month and two months).

In some example embodiments, the message expiration time is an amount of time that begins counting down when the message 422 is created. In this way, the expiration time runs beginning when the message 422 is created, regardless of whether the recipient member has viewed the message 422. In other example embodiments, the message expiration time is an amount of time that begins counting down when the message 422 is presented to the second member.

In some example embodiments, the social networking system (e.g., the system 120 in FIG. 1) transmits (812) the determined message expiration time recommendation to the first member. In some example embodiments, the message expiration time recommendation is displayed to the first member as part of a message creation interface.

In some example embodiments, the social networking system (e.g., the system 120 in FIG. 1) also transmits (814) analytic information for a plurality of potential expiration times. In this way, the first member can see the different response rates for a variety of different expiration times.

In some example embodiments, the social networking system (e.g., the system 120 in FIG. 1) receives (816) an expiration time selection from the first member.

Figure 8B:
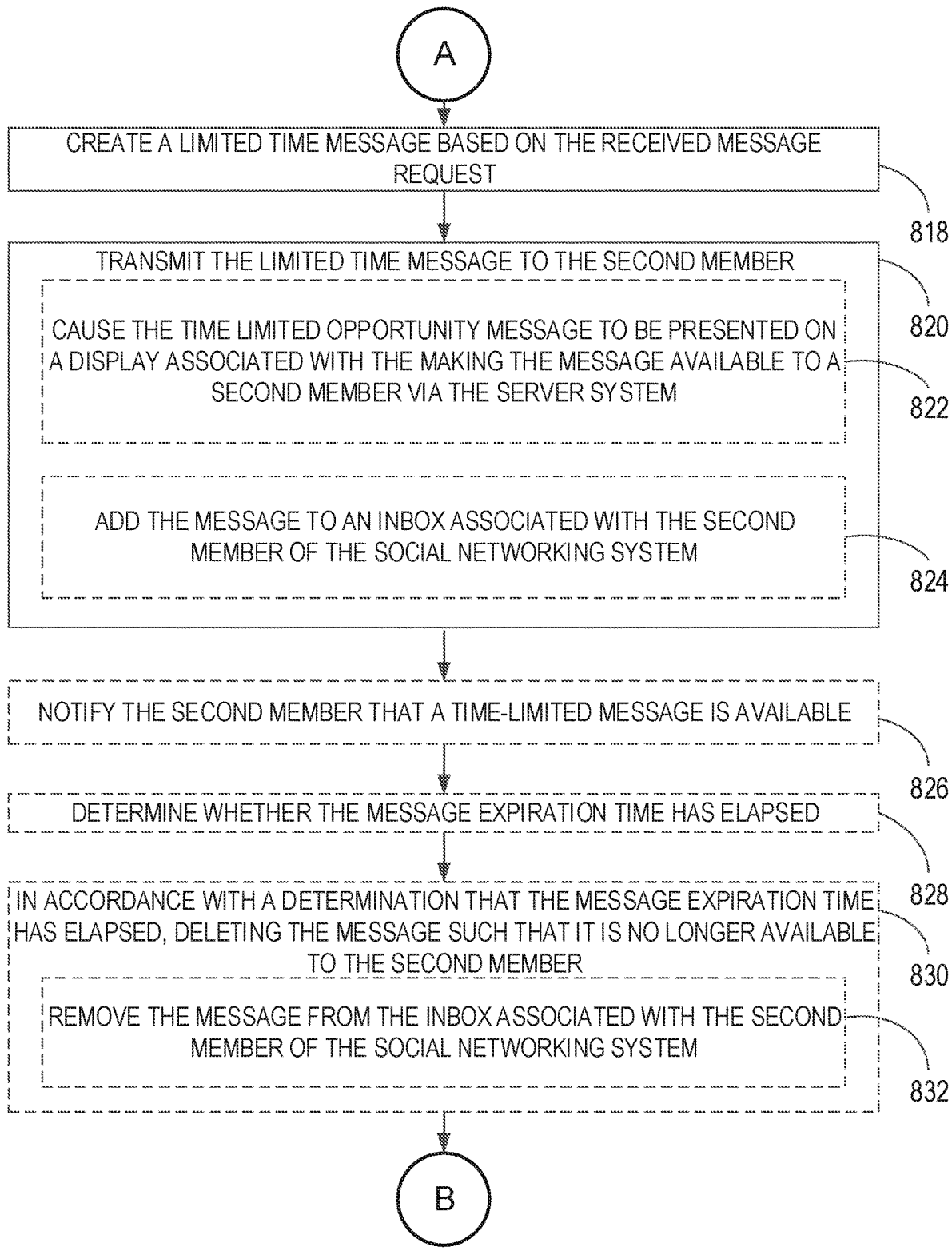

FIG. 8B is a flow diagram illustrating a method, in accordance with some example embodiments, for generating a recommended time limit for a message that includes an offer. Each of the operations shown in FIG. 8A may correspond to instructions stored in a computer memory or computer-readable storage medium. Optional operations are indicated by dashed lines (e.g., boxes with dashed-line borders). In some embodiments, the method described in FIG. 8A is performed by the social networking system (e.g., the system 120 in FIG. 1). However, the method described can also be performed by any other suitable configuration of electronic hardware. The method shown in FIG. 8B further continues the method of FIG. 8A.

In some embodiments, the method is performed by a social networking system (e.g., the system 120 in FIG. 1) including one or more processors and memory storing one or more programs for execution by the one or more processors.

In some example embodiments, the social networking system (e.g., the system 120 in FIG. 1) creates (818) a limited time message based on the received message request. In some example embodiments, creating a time limited message includes adding the message 422 to a database of message data 132 associated with the social networking system (e.g., the system 120 in FIG. 1).

In some example embodiments, the social networking system (e.g., the system 120 in FIG. 1) transmits (820) the limited time message to the second member. In some example embodiments, transmitting the opportunity message to the second member further comprises, the social networking system (e.g., the system 120 in FIG. 1) causing the time limited opportunity message to be presented on a display associated with the making the message 422 available to a second member via the social networking system 120 (822). For example, the member opens an email inbox with a list of members. The member selects the offer message and, in response, the social networking system (e.g., the system 120 in FIG. 1) transmits message data 132 to the client system (e.g., the client system 102 in FIG. 1) of the member and causes the client system (e.g., the client system 102 in FIG. 1) to display the message 422.

In other example embodiments, transmitting the opportunity message to the second member further comprises the social networking system (e.g., the system 120 in FIG. 1) adding (824) the message 422 to an inbox associated with the second member of the social networking system 120.

In some example embodiments, the social networking system (e.g., the system 120 in FIG. 1) notifies (826) the second member that a time-limited message is available. In some example embodiments, the notification is an email message. In other example embodiments, it is a text message or an audio message sent to a phone or messaging system. In yet other example embodiments, the notification is appears as a pop-up or text notification in an application customized to interact with the social networking system (e.g., the system 120 in FIG. 1). In some example embodiments, the member can, through member defined settings, determine how notifications are sent.

In some example embodiments, the social networking system (e.g., the system 120 in FIG. 1) determines (828) whether the message expiration time has elapsed. For example, the social networking system (e.g., the system 120 in FIG. 1) determines the amount of time elapsed since the creation of the message 422 (or since it was initially viewed by the recipient member) and compares that to the determined expiration time. If the elapsed time exceeds the expiration time, the message 422 is determined to be expired.

In accordance with a determination that the message expiration time has elapsed, the social networking system (e.g., the system 120 in FIG. 1) deletes (830) the message 422 such that it is no longer available to the second member. In some example embodiments, deleting the message 422 includes removing (832) the message from the inbox associated with the second member of the social networking system 120. In other example embodiments, deleting the message 422 includes deactivating the offer included with the message 422 and transmitting a notification about the offer deactivation to the recipient member.

In some example embodiments, when a message expires and is deleted or more, a record is stored at the social networking system (e.g., the system 120 in FIG. 1). This information will then be integrated into the data used to create response time analytics in the future.

Figure 8C:
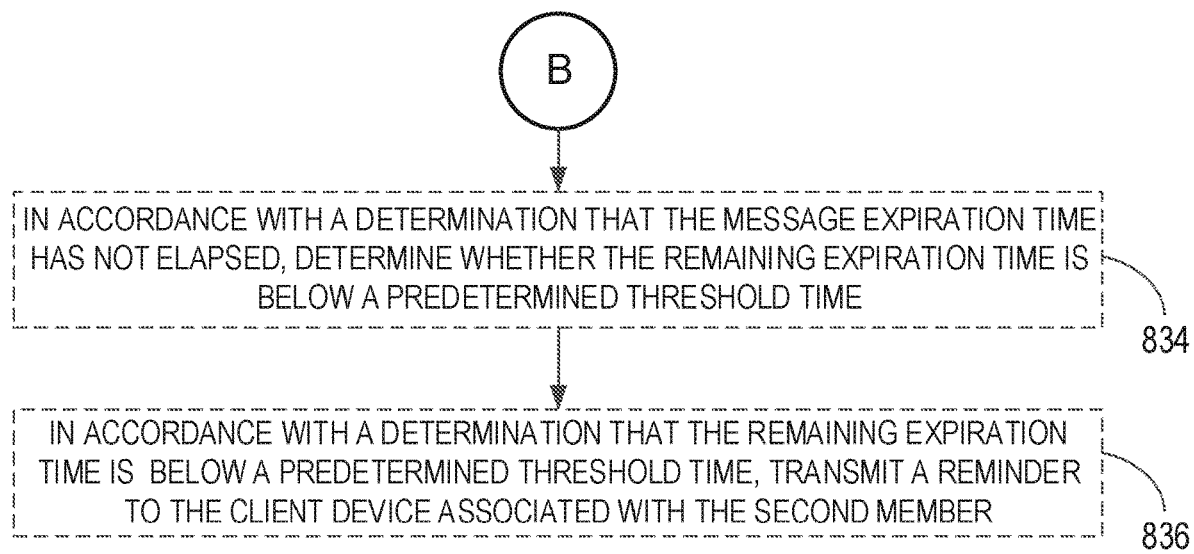

FIG. 8C is a flow diagram illustrating a method, in accordance with some example embodiments, for generating a recommended time limit for a message 422 that includes an offer. Each of the operations shown in FIG. 8C may correspond to instructions stored in a computer memory or computer-readable storage medium. Optional operations are indicated by dashed lines (e.g., boxes with dashed-line borders). In some embodiments, the method described in FIG. 8C is performed by the social networking system (e.g., the system 120 in FIG. 1). However, the method described can also be performed by any other suitable configuration of electronic hardware. The method shown in FIG. 8C further continues the method of FIGS. 8A and 8B.

In some embodiments, the method is performed by a social networking system (e.g., the system 120 in FIG. 1) including one or more processors and memory storing one or more programs for execution by the one or more processors.

In some example embodiments, in accordance with a determination that the message expiration time has not elapsed, the social networking system (e.g., the system 120 in FIG. 1) determines (834) whether the remaining expiration time is below a predetermined threshold time. For example, the predetermined threshold time is one day.

In accordance with a determination that the remaining expiration time is below a predetermined threshold time, the social networking system (e.g., the system 120 in FIG. 1) transmits (836) a reminder to the client device associated with the second member.

Software Architecture

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

Figure 9:
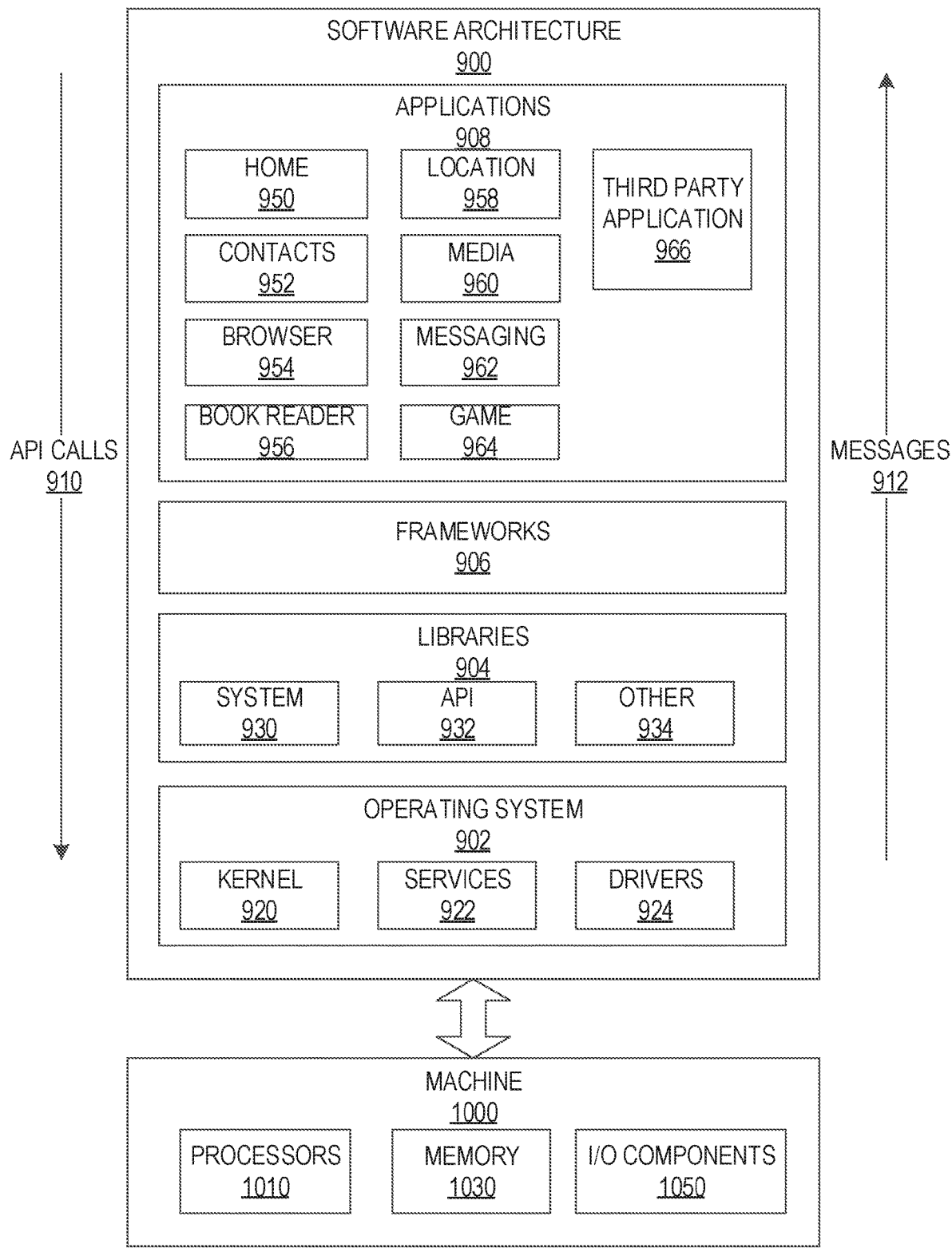
FIG. 9 is a block diagram illustrating an architecture of software, which may be installed on any of one or more devices, in accordance with some example embodiments.

FIG. 9 is a block diagram illustrating an architecture of software 900, which may be installed on any one or more of the devices of FIG. 1. FIG. 9 is merely a non-limiting example of an architecture of software 900 and it will be appreciated that many other architectures may be implemented to facilitate the functionality described herein. The software 900 may be executing on hardware such as a machine 1000 of FIG. 10 that includes processors 1010, memory 1030, and I/O components 1050. In the example architecture of FIG. 9, the software 900 may be conceptualized as a stack of layers where each layer may provide particular functionality. For example, the software 900 may include layers such as an operating system 902, libraries 904, frameworks 906, and applications 908. Operationally, the applications 908 may invoke API calls 910 through the software stack and receive messages 912 in response to the API calls 910.

The operating system 902 may manage hardware resources and provide common services. The operating system 902 may include, for example, a kernel 920, services 922, and drivers 924. The kernel 920 may act as an abstraction layer between the hardware and the other software layers. For example, the kernel 920 may be responsible for memory management, processor management (e.g., scheduling), component management, networking, security settings, and so on. The services 922 may provide other common services for the other software layers. The drivers 924 may be responsible for controlling and/or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 904 may provide a low-level common infrastructure that may be utilized by the applications 908. The libraries 904 may include system libraries 930 (e.g., C standard library) that may provide functions such as memory allocation functions, string manipulation functions, mathematic functions, and the like. In addition, the libraries 904 may include API libraries 932 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 904 may also include a wide variety of other libraries 934 to provide many other APIs to the applications 908.

The frameworks 906 may provide a high-level common infrastructure that may be utilized by the applications 908. For example, the frameworks 906 may provide various graphical user interface (GUI) functions, high-level resource management, high-level location services, and so forth. The frameworks 906 may provide a broad spectrum of other APIs that may be utilized by the applications 908, some of which may be specific to a particular operating system 902 or platform.

The applications 908 include a home application 950, a contacts application 952, a browser application 954, a book reader application 956, a location application 958, a media application 960, a messaging application 962, a game application 964, and a broad assortment of other applications, such as a third party application 966. In a specific example, the third party application 966 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 966 may invoke the API calls 910 provided by the mobile operating system, such as the operating system 902, to facilitate functionality described herein.

Example Machine Architecture and Machine-Readable Medium

Figure 10:
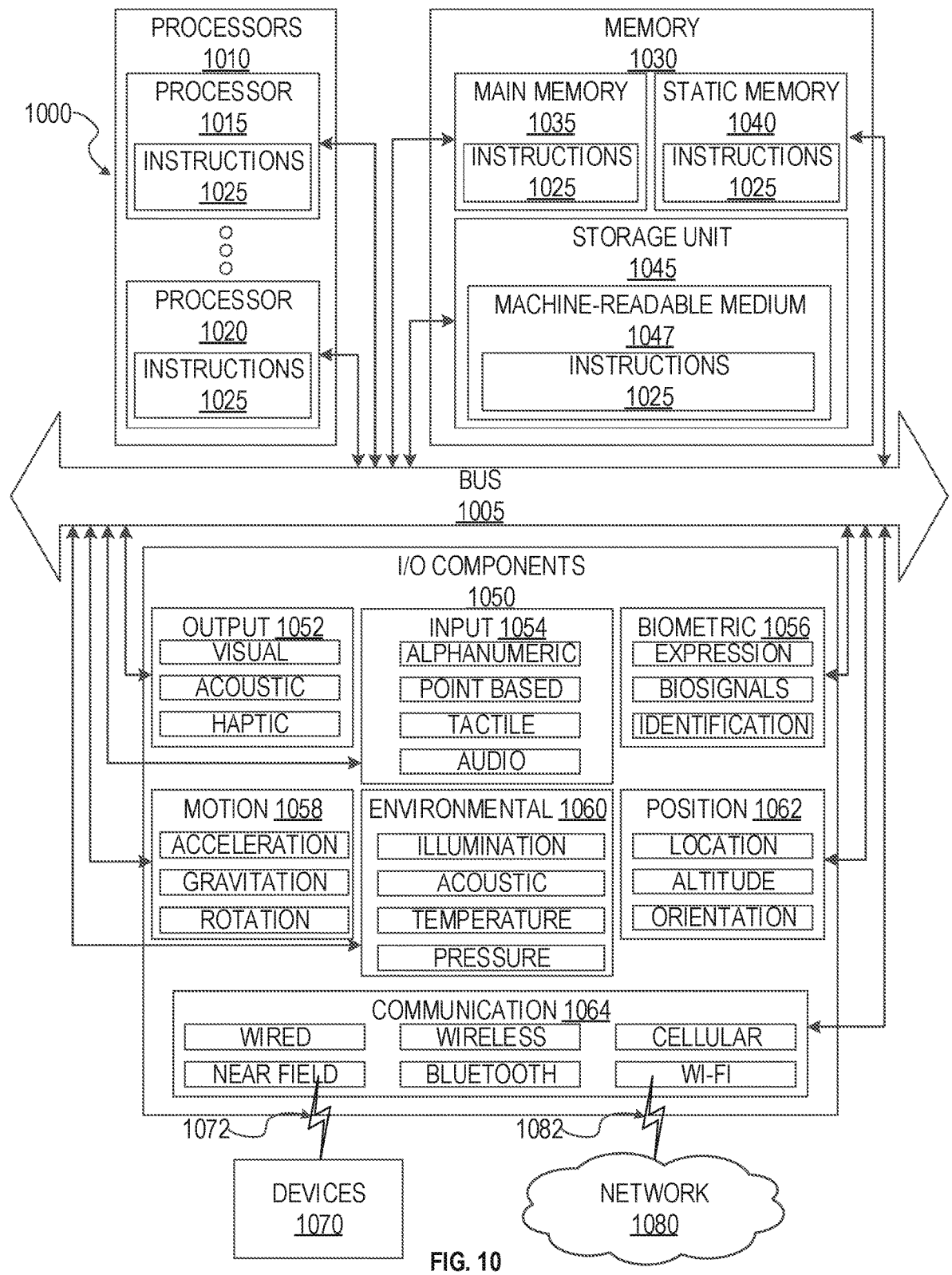
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1025 (e.g., software 900, a program, an application 908, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but be not limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1025, sequentially or otherwise, that specify actions to be taken by the machine 1000. Further, while only a single machine 1000 is illustrated, the term "machine" shall also be taken to include a collection of machines 1000 that individually or jointly execute the instructions 1025 to perform any one or more of the methodologies discussed herein.

The machine 1000 may include processors 1010, memory 1030, and I/O components 1050, which may be configured to communicate with each other via a bus 1005. In an example embodiment, the processors 1010 (e.g., a CPU 302, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1015 and a processor 1020, which may execute the instructions 1025. The term "processor" is intended to include multi-core processors 1010 that may comprise two or more independent processors 1015, 1020 (also referred to as "cores") that may execute the instructions 1025 contemporaneously. Although FIG. 10 shows multiple processors 1010, the machine 1000 may include a single processor 1010 with a single core, a single processor 1010 with multiple cores (e.g., a multi-core processor), multiple processors 1010 with a single core, multiple processors 1010 with multiple cores, or any combination thereof.

The memory 1030 may include a main memory 1035, a static memory 1040, and a storage unit 1045 accessible to the processors 1010 via the bus 1005. The storage unit 1045 may include a machine-readable medium 1047 on which are stored the instructions 1025 embodying any one or more of the methodologies or functions described herein. The instructions 1025 may also reside, completely or at least partially, within the main memory 1035, within the static memory 1040, within at least one of the processors 1010 (e.g., within the processor's cache memory), or any suitable combination thereof, during execution thereof by the machine 1000. Accordingly, the main memory 1035, the static memory 1040, and the processors 1010 may be considered machine-readable media 1047.

As used herein, the term "memory" refers to a machine-readable medium 1047 able to store data temporarily or permanently and may be taken to include, but not be limited to, random-access memory (RAM), read-only memory (ROM), buffer memory, flash memory, and cache memory. While the machine-readable medium 1047 is shown, in an example embodiment, to be a single medium, the term "machine-readable medium" should be taken to include a single medium or multiple media (e.g., a centralized or distributed database, or associated caches and servers) able to store the instructions 1025. The term "machine-readable medium" shall also be taken to include any medium, or combination of multiple media, that is capable of storing instructions (e.g., instructions 1025) for execution by a machine (e.g., machine 1000), such that the instructions 1025, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 may include a wide variety of components to receive input, provide and/or produce output, transmit information, exchange information, capture measurements, and so on. It will be appreciated that the I/O components 1050 may include many other components that are not shown in FIG. 10. In various example embodiments, the I/O components 1050 may include output components 1052 and/or input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 1050 may include biometric components 1056, motion components 1058, environmental components 1060, and/or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 1062 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 and/or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine 1000 and/or any of a wide variety of peripheral devices (e.g., a peripheral device coupled via a USB).

Moreover, the communication components 1064 may detect identifiers and/or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1025 may be transmitted and/or received over the network 1080 using a transmission medium via a network interface device (e.g., a network interface component included in the communication components 1064) and utilizing any one of a number of well-known transfer protocols (e.g., HTTP). Similarly, the instructions 1025 may be transmitted and/or received using a transmission medium via the coupling 1072 (e.g., a peer-to-peer coupling) to the devices 1070. The term "transmission medium" shall be taken to include any intangible medium that is capable of storing, encoding, or carrying the instructions 1025 for execution by the machine 1000, and includes digital or analog communications signals or other intangible media to facilitate communication of such software 900.

Furthermore, the machine-readable medium 1047 is non-transitory (in other words, not having any transitory signals) in that it does not embody a propagating signal. However, labeling the machine-readable medium 1047 as "non-transitory" should not be construed to mean that the medium is incapable of movement; the medium should be considered as being transportable from one physical location to another. Additionally, since the machine-readable medium 1047 is tangible, the medium may be considered to be a machine-readable device.

TERM USAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A computer-implemented method performed at a server system, using at least one computer processor, the method comprising:

presenting to a first member of a social networking system a user interface for composing a message to be communicated to a second member of the social networking system, the user interface having i) a content area via which the first member can specify content for the message to be communicated to the second member, ii) an offer area via which the first member can specify an offer to be made to the second member, and iii) a user interface control element that enables the first member to generate a request to make the message a limited time message;

responsive to the first member interacting with the user interface control element, receiving a request to make the message a limited time message;

responsive to receiving the request:

accessing member profile data associated with the second member, the member profile data associated with the second member including message response history data of the second member;

determining analytic information including a plurality of message expiration time recommendations and for each recommendation a likelihood that the second member will respond to the message within the expiration time being recommended, the analytic information derived based, at least in part, on member profile data of a plurality of members and using a model that has been generated using a computer learning technique, the model trained using message response history data of the plurality of members as included in the member profile data of the plurality of members;

transmitting the analytic information for presentation to the first member in the user interface;

receiving an expiration time selection from the first member, the expiration time selection indicating a message expiration time to be applied to the message; and creating a limited time message set to self-delete subsequent to being delivered to the second member when the message expiration time has elapsed, such that the limited time message will not be viewable by the second member when the message expiration time has elapsed; and transmitting the limited time message to the second member.

2. The method of claim 1, wherein transmitting the analytic information for presentation to the first member in the user interface includes presenting to the first member the plurality of expiration time recommendations, and with each recommendation, a likelihood that the second member will respond to the message with the expiration time being recommended.

3. The method of claim 1, further comprising:
notifying the second member that a time-limited message is available.

4. The method of claim 1, wherein the message expiration time is an amount of time that begins counting down when the message is created.

5. The method of claim 1; wherein the message expiration time is an amount of time that begins counting down when the message is presented to the second member.

6. The method of claim 1, further comprising:
in accordance with a determination that the message expiration time has not elapsed, determining whether the remaining expiration time is below a predetermined threshold time;
in accordance with a determination that the remaining expiration time is below a predetermined threshold time, transmitting a reminder to a client device associated with the second member, the reminder indicating the remaining expiration time for the limited time message.

7. The method of claim 1, wherein transmitting the limit time message to the second member further comprises:
causing the limited time message to be presented on a display associated with making the message available to the second member via the server system.

8. The method of claim 1, wherein transmitting the limited time message to the second member further comprises:
adding the message to an inbox associated with the second member of the social networking system, and wherein deleting the limited time message further comprises removing the message from the inbox associated with the second member of the social networking system.

9. A system comprising:
one or more processors;
memory; and
one or more programs stored in the memory, the one or more programs comprising instructions for:
presenting to a first member of a social networking system a user interface for composing a message to be communicated to a second member of the social networking system, the user interface having i) a content area via which the first member can specify content for the message to be communicated to the second member, ii) an offer area via which the first member can specify an offer to be made to the second member; and iii) a user interface control element that enables the first member to generate a request to make the message a limited time message;

responsive to the first member interacting with the user interface control element, receiving a request to make the message a limited time message;

responsive to receiving the request:

accessing member profile data associated with the second member, the member profile data associated with the second member including message response history data of the second member;

determining analytic information including a plurality of message expiration time recommendations and for each recommendation a likelihood that the second member will respond to the message within the expiration time being recommended, the analytic information derived based, at least in part, on member profile data of a plurality of members and using a model that has been generated using a computer learning technique, the model trained using message response history data of the plurality of members as included in the member profile data of the plurality of members;

receiving an expiration time selection from the first member, the expiration time selection indicating a message expiration time to be applied to the message; and creating a limited time message set to self-delete subsequent to being delivered to the second member when the message expiration time has elapsed, such that the limited time message will not be viewable by the second member when the message expiration time has elapsed; and transmitting the limited time message to the second member.

10. The system of claim 9,
wherein transmitting the analytic information for presentation to the first member in the user interface includes presenting to the first member the plurality of expiration time recommendations, and with each recommendation, a likelihood that the second member will respond to the message with the expiration time being recommended.

11. The system of claim 9, further comprising instructions for:
determining whether the message expiration time has elapsed;
in accordance with a determination that the message expiration time has elapsed, deleting the message such that it is no longer available to the second member.

12. A non-transitory computer-readable storage medium storing instructions that, when executed by the one or more processors of a machine, cause the machine to perform operations comprising:
presenting to a first member of a social networking system a user interface for composing a message to be communicated to a second member of the social networking system, the user interface having i) a content area via which the first member can specify content for the message to be communicated to the second member, ii) an offer area via which the first member can specify an offer to be made to the second member, and iii) a user interface control element that enables the first member to generate a request to make the message a limited time message;

responsive to the first member interacting with the user interface control element, receiving a request to make the message a limited time message;

responsive to receiving the request:

accessing member profile data associated with the second member, the member profile data of the second member including message response history data of the second member;

determining analytic information including a plurality of message expiration time recommendations and for each recommendation a likelihood that the second member will respond to the message within the expiration time being recommended, the analytic information derived based, at least in part, on member profile data of a plurality of members and using a model that has been generated using a computer learning technique, the model trained using message response history data of the plurality of members as included in the member profile data of the plurality of members;

receiving an expiration time selection from the first member, the expiration time selection indicating a message expiration time, the expiration time selection indicating a message expiration time to be applied to the message; and set to self-delete subsequent to being delivered to the second member when the message expiration time has elapsed, such that the limited time message will not be viewable by the second member when the message expiration time has elapsed; and transmitting the limited time message to the second member.

13. The non-transitory computer-readable storage medium of claim 12, wherein transmitting the analytic information for presentation to the first member in the user interface includes presenting to the first member the plurality of expiration time recommendations, and with each recommendation, a likelihood that the second member will respond to the message with the expiration time being recommended.

* * * * *

UNITED STATES PATENT AND TRADEMARK OFFICE
CERTIFICATE OF CORRECTION

PATENT NO. : 10,931,620 B2
APPLICATION NO. : 15/276421
DATED : February 23, 2021
INVENTOR(S) : Andrianakou et al.

Page 1 of 1

It is certified that error appears in the above-identified patent and that said Letters Patent is hereby corrected as shown below:

In the Claims

In Column 27, Line 25, in Claim 5, delete "claim 1;" and insert --claim 1,-- therefor In Column 27, Line 39, in Claim 7, delete "limit" and insert --limited-- therefor In Column 27, Line 64, in Claim 9, delete "member;" and insert --member,-- therefor Signed and Sealed this
Eighth Day of June, 2021

Drew Hirshfeld
*Performing the Functions and Duties of the
Under Secretary of Commerce for Intellectual Property and
Director of the United States Patent and Trademark Office*